(12) United States Patent
Cuddihy et al.

(10) Patent No.: US 10,963,800 B2
(45) Date of Patent: Mar. 30, 2021

(54) SERVICE LAYER AUGMENTATION OF RESPONSE TO SEMANTICALLY-INFORMED QUERY OF ARBITRARY EXTERNAL DATA SOURCES

(71) Applicant: General Electric Company, Schenectady, NY (US)

(72) Inventors: Paul Edward Cuddihy, Ballston Lake, NY (US); Justin McHugh, Latham, NY (US); Jenny Marie Weisenberg Williams, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 862 days.

(21) Appl. No.: 15/659,329

(22) Filed: Jul. 25, 2017

(65) Prior Publication Data

US 2019/0034811 A1    Jan. 31, 2019

(51) Int. Cl.
  *G06N 5/04* (2006.01)
  *G06N 5/02* (2006.01)
  *G06F 9/06* (2006.01)
  *G06F 16/2453* (2019.01)
  *G06N 5/00* (2006.01)

(52) U.S. Cl.
  CPC ............... *G06N 5/04* (2013.01); *G06F 9/06* (2013.01); *G06F 16/24535* (2019.01); *G06N 5/003* (2013.01); *G06N 5/02* (2013.01); *G06N 5/022* (2013.01)

(58) Field of Classification Search
  None
  See application file for complete search history.

(56) References Cited

U.S. PATENT DOCUMENTS

| | | |
|---|---|---|
| 9,286,362 B2 | 3/2016 | Lokitar et al. |
| 9,396,283 B2 | 7/2016 | Miranker et al. |
| 2008/0256026 A1 | 10/2008 | Hays et al. |
| 2014/0025694 A1 | 1/2014 | Ryman et al. |
| 2016/0078128 A1 | 3/2016 | McHugh et al. |

(Continued)

OTHER PUBLICATIONS

Chen, et al., Semantic Web for Integrated Network Analysis in Biomedicine, Briefings in Bioinformatics, vol. 10, No. 2, 2009, pp. 177-192 (Year: 2009).*

(Continued)

*Primary Examiner* — Wilbert L Starks
(74) *Attorney, Agent, or Firm* — Buckley, Maschoff & Talwalkar LLC

(57) ABSTRACT

A method of augmenting a semantic query of multiple external data sources including receiving a request to search a data store for fields-of-interest designated by a user, applying path-finding technique(s) to identify connections between the fields-of-interest in a semantic model, generating a query based on the connections, intercepting the executing query to determine if data for the fields-of-interest are contained in an external data store, if so identifying an external data service to retrieve external data, executing a semantic query on a triple store, fusing results from the semantic query with the retrieved external data, and providing the fused results to the user computing device. A system and a non-transitory computer readable medium are also disclosed.

18 Claims, 4 Drawing Sheets

(56) References Cited

U.S. PATENT DOCUMENTS

2016/0283511 A1 9/2016 Fokoue et al.
2016/0364478 A1 12/2016 Devarao

OTHER PUBLICATIONS

Neelakantan, Knowledge Representation and Reasoning with Deep Neural Networks, Doctoral Thesis, University of Massachusetts Amherst, 2017, pp. 1-121 (Year: 2017).*

Laborie et al., "Managing and Querying Efficiently Distributed Semantic Multimedia Metadata Collections", IEEE MultiMedia, vol. PP, Issue 99, pp. 1-1, http://ieeexplore.ieee.org/document/5255216/, Sep. 22, 2009, 9 pp.

Le-Phuoc et al., "A Native and Adaptive Approach for Unified Processing of Linked Streams and Linked Data", International Semantic Web Conference, vol. 7031, pp. 370-388, https://link.springer.com/chapter/10.1007%2F978-3-642-25073-6_24, 2011, 19 pp.

"Query Suggestion System and Method", IP.com Prior Art Database, https://priorart.ip.com/IPCOM/000241316, Apr. 16, 2015, 11 pp.

* cited by examiner

SERVICE LAYER AUGMENTATION OF RESPONSE TO SEMANTICALLY-INFORMED QUERY OF ARBITRARY EXTERNAL DATA SOURCES

BACKGROUND

Knowledge graphs can be used by cognitive and artificial intelligence applications such as digital assistants, chat bots, and intelligent search engines. Knowledge graphs tend to be closely associated with knowledge bases and semantic web technologies. Knowledge graphs can be associated with linked data that can be computationally analyzed to reveal patterns, trends, and associations relating to human behavior and interactions.

Conventional semantic knowledge bases can be implemented in commercial cognitive and artificial intelligence applications such as semantic search, digital assistants, social media analytics, and continuous online learning. The domain of knowledge graphs can vary for specific applications, and could range from all available information on the World Wide Web (web-scale knowledge graphs—e.g., the Google Knowledge Graph and Microsoft Bing Satori for large search engines) to a restricted set of information only available within an enterprise (enterprise knowledge graphs—e.g., LinkedIn Knowledge Graph and Facebook Entity Graph for search and recommendations). The size of web-scale and enterprise knowledge graphs can differ depending on the application's data sources and the rate at which new knowledge is acquired and inferred. Today, knowledge graphs comprising millions to billions of entities and tens to hundreds of billions of associated facts and relationships between those entities are used to power critical applications in large-scale enterprises.

Conventional technology stacks chosen by organizations to construct and maintain knowledge graphs can have considerable variation. Knowledge graphs in the Linked Open Data Cloud and those that enable semantic web search typically use standard Semantic Web technologies. In contrast, organizations using knowledge graphs for specific, highly targeted applications are more likely to develop custom technologies and adopt alternative approaches (such as the property graph model) to represent knowledge. As a consequence, there is little standardization in conventional knowledge graph techniques across different commercial enterprises.

In many organizations data comes in many different forms including, for example, time series, images, large files, and property graphs. These forms of data are not suitable for storage in a semantics-based knowledge graph, due to either their binary nature and/or the large amount of overhead necessary to store them in a semantic store. Conventional approaches are unable to apply the benefits of semantics (e.g., domain term descriptions, links to intra-organization data, etc.) to these data forms.

Missing from the art is a system and method that can build a knowledge-driven framework with the capability to construct polyglot persistent knowledge graphs allowing data to be transparently stored in the location best suited to the data type, whether semantic triple stores or non-semantic stores such as property graphs, relational, and/or big data storage systems. Also missing from the art is a set of services and interfaces that allow non-IT users to create queries via a drag-and-drop user interface to explore knowledge graphs, providing them a single point of access to data in semantic stores, Big Data repositories, and more.

DETAILED DESCRIPTION

Figure 1:
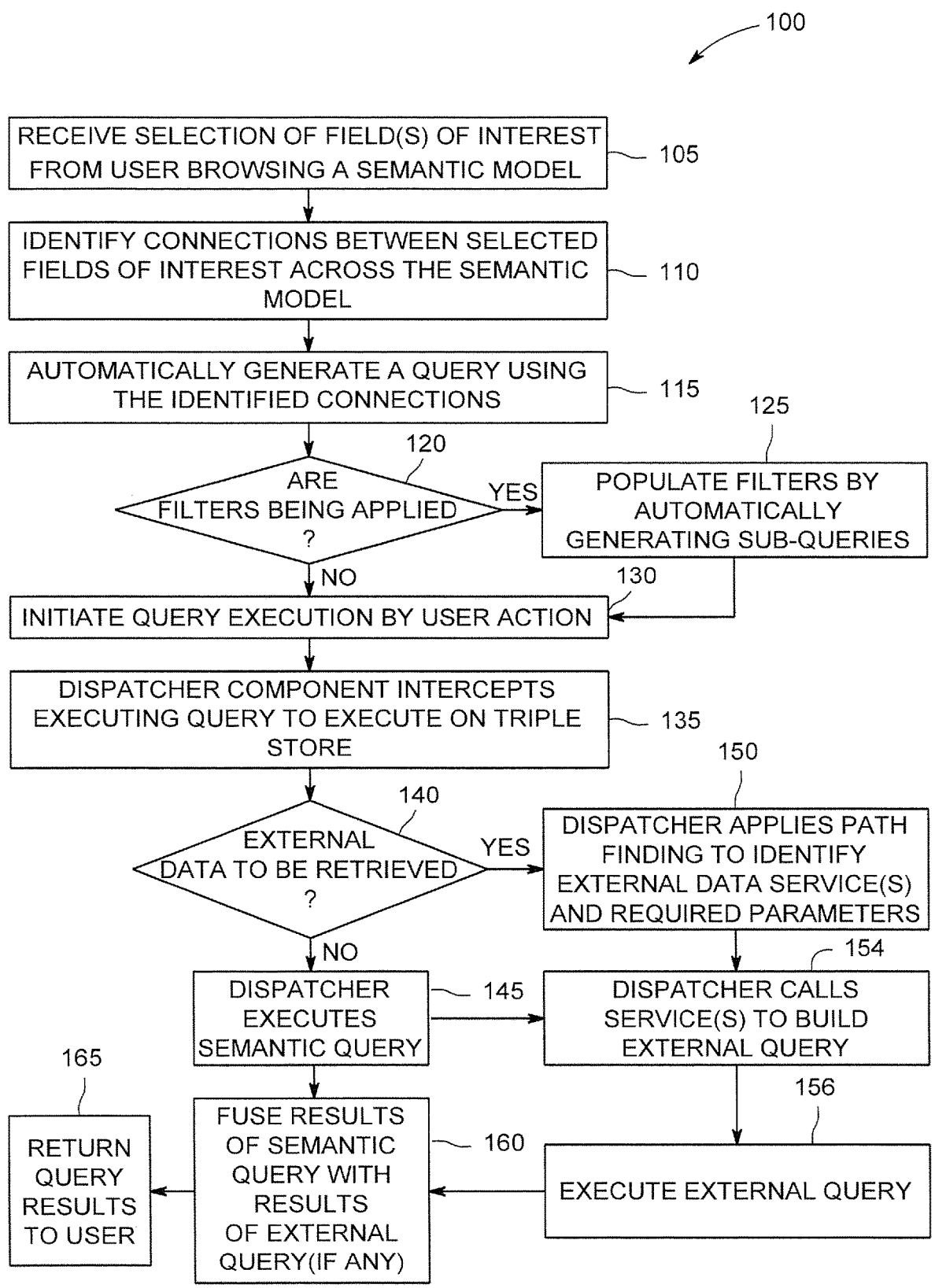
FIG. 1 depicts a flowchart of a process for augmenting a semantic query of multiple environments in accordance with embodiments.

A knowledge graph can be viewed as an abstraction layer where: (1) information from multiple (potentially Big Data) data sources can be seamlessly integrated through the use of ontologies; and (2) an implementation of this abstraction layer can be coupled with extensible services that allow applications to effectively utilize data from these sources via the knowledge graph.

Embodying systems and methods provide a standardized approach in constructing and maintaining actionable knowledge graphs representing disparate Big Data sources, making data from these sources consumable by both humans and machines in a variety of application scenarios.

In accordance with embodiments, a framework provides programmers convenient access to semantic web technologies. This framework logically links the contents of disparate Big Data stores through a common model-driven interface. Rather than requiring that the contents of disparate data stores be imported into the semantic store, the framework enables data to be stored in external locations (e.g., distributed file system, time series database, etc.) best adapted to the data type, storage and access patterns required, and data volume (i.e., "polyglot persistence").

Metadata describing these external stores, including what data they contain and how to query them, is modeled and loaded into the semantic triple store. The external stores can be linked via semantic models to data contained in the triple store or other external Big Data stores. The Big Data in external stores can be queried, post-processed and filtered based on constraints passed to the framework services. When operations are completed, partial results from various stores are merged, presenting a single result set which contains both the Big Data and the semantic context related to the records.

In accordance with embodiments, a knowledge-driven framework can include the capability to construct polyglot persistent knowledge graphs allowing data to be transparently stored in the location best suited to the data type (whether semantic triple stores or non-semantic stores such as property graphs, relational, and/or big data storage systems), while giving the appearance that the data is fully captured within a knowledge graph.

An embodying system can include a set of services and interfaces that provide a query generation abstraction layer so that non-IT users can create queries via a drag-and-drop user interface to explore knowledge graphs, providing the user with a single point of access to data in semantic stores, Big Data repositories, and more. This framework can provide users the flexibility to utilize an underlying storage technology for each data type while maintaining a single interface and point of access, giving users a knowledge-driven veneer across their diverse data.

In accordance with embodiments, the framework can include one or more of the following features:
- a nodegroup that is a datatype abstraction for the subgraph of interest;
- services and libraries for processing the nodegroup and determining the division between semantic and non-semantic data;
- a query integration unit that can integrate queries into workflows/applications;
- connectors for access to new data stores; and
- a service layer with local path-finding ability in linked data that can automatically find additional information required for data retrieval from non-semantic stores.

In accordance with embodiments, knowledge graphs built on a semantic web technology stack have a semantic domain model (referred to as an ontology) as their foundation. The ontology defines the universe of all possible types of entities in the domain, their structure and properties, and relationships between these elements. When instance data is added, the combination of the domain model plus instance data allows for a consistent representation of the data and its relationships in a computable form.

The computable nature of the ontology in the semantic web tech stack enables the interrogation of the semantic model to determine the relationships between classes or concepts and by extension, their properties. This is accomplished by calculating the path between two concepts and/or properties in the model, and then applying the knowledge of that path to the instance data.

Semantic web technologies are extremely useful for capturing and retrieving information structured in ways that are most intuitive to domain experts. The removal of the need to understand a database schema or other data storage mechanism, lowers the barrier of entry for users to access and benefit from the knowledge base. Conveniences such as automated pathfinding and domain-specific terminology make the interactions natural. Additionally, programmatic access can be achieved using strategies understood by (non-IT) domain experts. Embodying systems and methods use this type of interface to access data, thus, providing easier access to subject matter experts and programmers alike.

Many types of data are not well-suited to storage and processing within a semantic triple store. Image files, often sized from the tens of kilobytes to tens of gigabytes, cannot be effectively stored and processed by triple stores (though metadata derived from such images are often very well suited for storage in a triple store). Data such as time series has a very high overhead when captured in a triple store, and placing time series datasets in such a store would sacrifice many useful features that exist in most time series databases known as 'historians' (e.g., optimizations for efficient access in chronological order, capabilities to restream data, and built-in operations such as time alignment, interpolation and aggregation).

Even if time series data could be efficiently stored in a triple store, it is often very valuable to calculate and process metrics derived from raw time series data streams, which is difficult to do using typical semantic web technologies. Unlike SQL, SPARQL does not offer a general purpose computational capability. Overall, it would be ideal to be able to store different types of data wherever it is most efficiently kept and query those diverse types of data directly from the Semantic Web stack.

Further, organizations may opt to store certain types of data (e.g., asset data) in a property graph, instead of loading this data into a triple store. Property graph models allow entities and relationships to have rich, complex properties that can be indexed and searched. Embodying systems and methods provide the ability to search a property graph data from the Semantic Web stack.

Unlike data stored in a triple store and accessed via the Semantic Web tech stack, most external stores and services do not have the ability for domain experts to define models of the data, including models of the relationships present in the data or how the data may be related to external data stores or entities. For instance, in relational databases, beyond the establishment of foreign keys there is little clarity as to how two columns in a database table are related to each other, or to the entities represented in the row. From a SQL database description, it can be possible to enumerate foreign key relationships, but there is no required metadata to indicate the true semantic meaning of those relationships or when multiple relationships are intended to convey the same intent. Some services and stores, such as many time series stores and many streams, lack embedded context about their data, requiring the user or caller to obtain it from another system (usually in some non-computable format captured as a text file or spreadsheet-based data dictionary).

In the cases above, the responsibility of applying a model to understand the context of the data is placed on the caller. This can lead to the development of multiple, potentially divergent interpretations of the same information. The tendency for such context to be embedded directly into applications removes the ability for such interpretations to be directly compared and harmonized. Extending the semantics stack to allow modeling of and access to data and services not directly housed in a triple store would allow subject matter experts and application developers alike to interact with both the context and data from external services as though it were stored in a traditional triple store.

Knowledge graphs are often used to store data about entities and their relationships which correlate to some set of things or concepts that exist in the world. Embodying systems and methods can extend the knowledge graph model to store entities and relationships describing how a caller would access instance data for entities that are stored externally to the semantic store. The data types, services required, and criteria for access can be modeled and used to create a source of truth for external access.

With the knowledge graph containing both information about the entities and relationships to act as context, as well as information required to query and return external data, new services can be built to automate the retrieval of instance data in the context of the domain model. Through these services, the consumer of the data does not require any practical knowledge as to where the instance data is stored. The instance data could reside in a triple store, historian, distributed file system, or spread out across a collection of federated data stores. The system presented in this paper is designed to enable the modeling of diverse datasets and automate the retrieval and integration of that data in a manner transparent to the consumer.

An embodying framework can deliver the benefits of the semantic web stack to a wider array of applications. In particular, the framework can enable the retrieval of Big Data based on semantically-defined characteristics describing information about the data such as how it was acquired, what it contains, or how it relates to different sets of data.

Abstracting the data in this way allows application programmers and analytics to describe the desired information qualitatively, while relying on the framework to maintain awareness of data locations and perform retrieval of the data. Describing the desired data by its needed qualifications rather than by the literal schema creates opportunities for easier reuse across systems and analytics, as datasets cease to be tied to specific data store-specific queries and instead are dependent on output sets of a given format, fulfilled by the system. Further, the framework simplifies the task of data retrieval, serving as single logical source that retrieves and fuses data from multiple underlying semantic and Big Data sources.

Embodying systems and methods utilizing the framework can provide two important benefits. First, the use of metadata to generate external queries and fuse results allows for each type of underlying external data to be maintained in the type of data store to which it is best suited. Second, the framework enables movement of underlying data to a new data store in a way that is transparent to users. Provided that the destination data store supports retrieval by the framework services, this move only requires updating the metadata to reflect the new external data location(s). The data can thus be moved without requiring action by consumers.

The framework can be based on semantic domain models, which explicitly capture the structure of domain concepts/data and relationships between them. Capturing this knowledge in the shared semantic layer, rather than in the code or retrieval mechanisms, makes visible any potential mismatches and conflicting assumptions between use cases, and also allows analytic and use requirements to be directly compared.

FIG. 1 depicts process 100 for augmenting a semantic query of multiple environments in accordance with embodiments. By way of example, an embodying basic flow for a typical use of the framework can begin with receiving, step 105, a selection of field(s) of interest from a user browsing a semantic model. Connections are identified, step 110, between the selected fields of interest across the semantic model. In some implementations, this identification can occur as the selections are received from the user. The connections can be used to automatically generate a query, step 115. If a user chooses to apply filters to any of the fields of interest, step 120, process 100 can proceed to step 125. Sub-queries can be automatically generated (step 125) to populate the filters. If the user does not choose to apply filters, the process continues to step 130, where the user initiates query execution. After the user executes the query, a dispatcher component intercepts the query (step 135). The dispatcher determines whether the instance data for any fields of interest are contained in external stores, step 140. If there was no external data to be retrieved, process 100 continues to step 145. If external stores are to be queried, the dispatcher component applies pathfinding techniques, step 150, to identify external data services, along with the required parameters, to retrieve this external data. The dispatcher calls, step 154, external service(s) to build the query for the external store(s). The external query is executed, step 156. The dispatcher executes the semantic query on the triple store, step 145. Finally, the dispatcher fuses results from the semantic and external queries (if any), step 160. Results are returned, step 165, to the user.

Figure 2A:
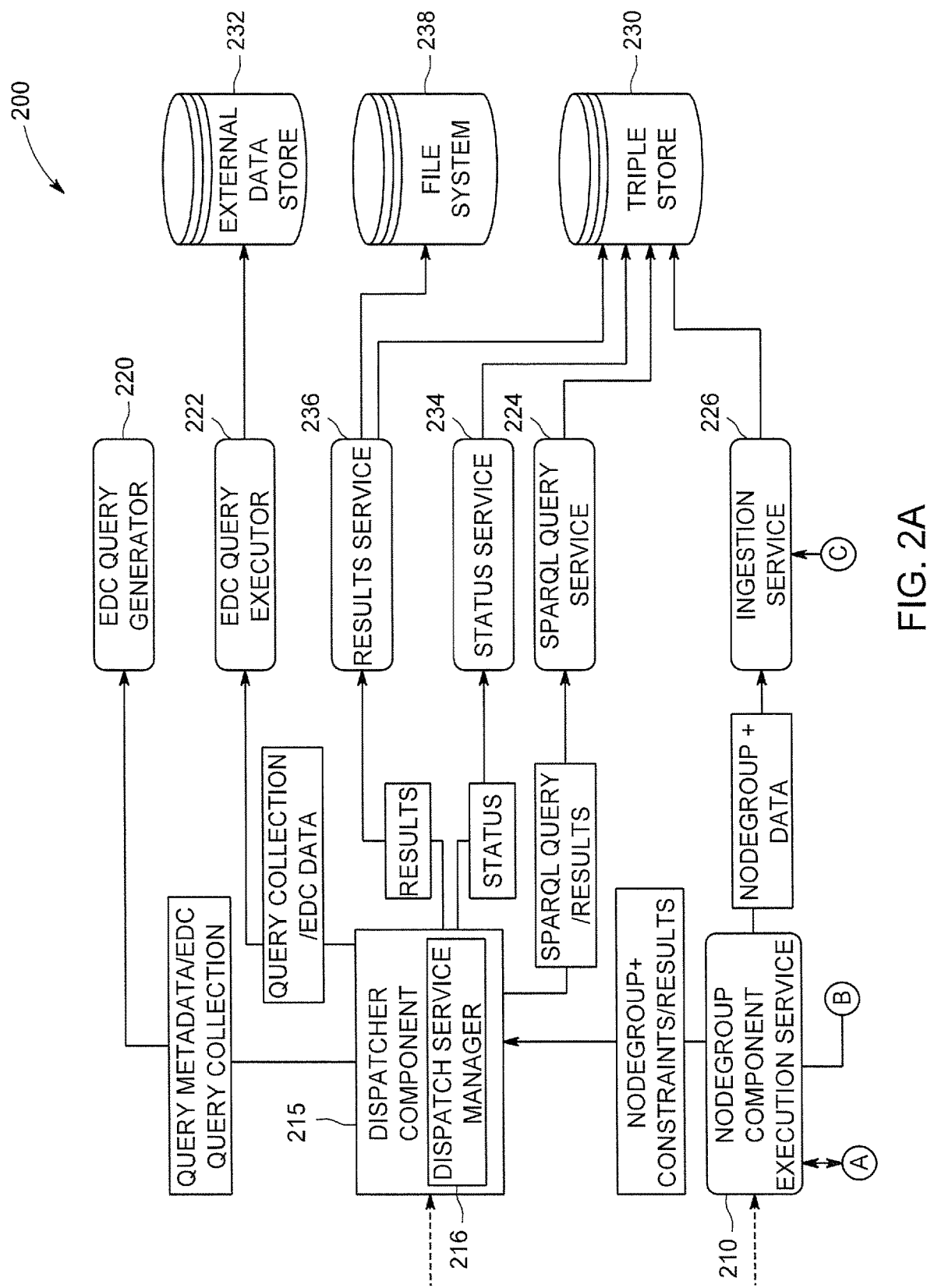
FIGS. 2A-2B depict a framework system for querying semantics from multiple environments in accordance with embodiments.
Figure 2B:
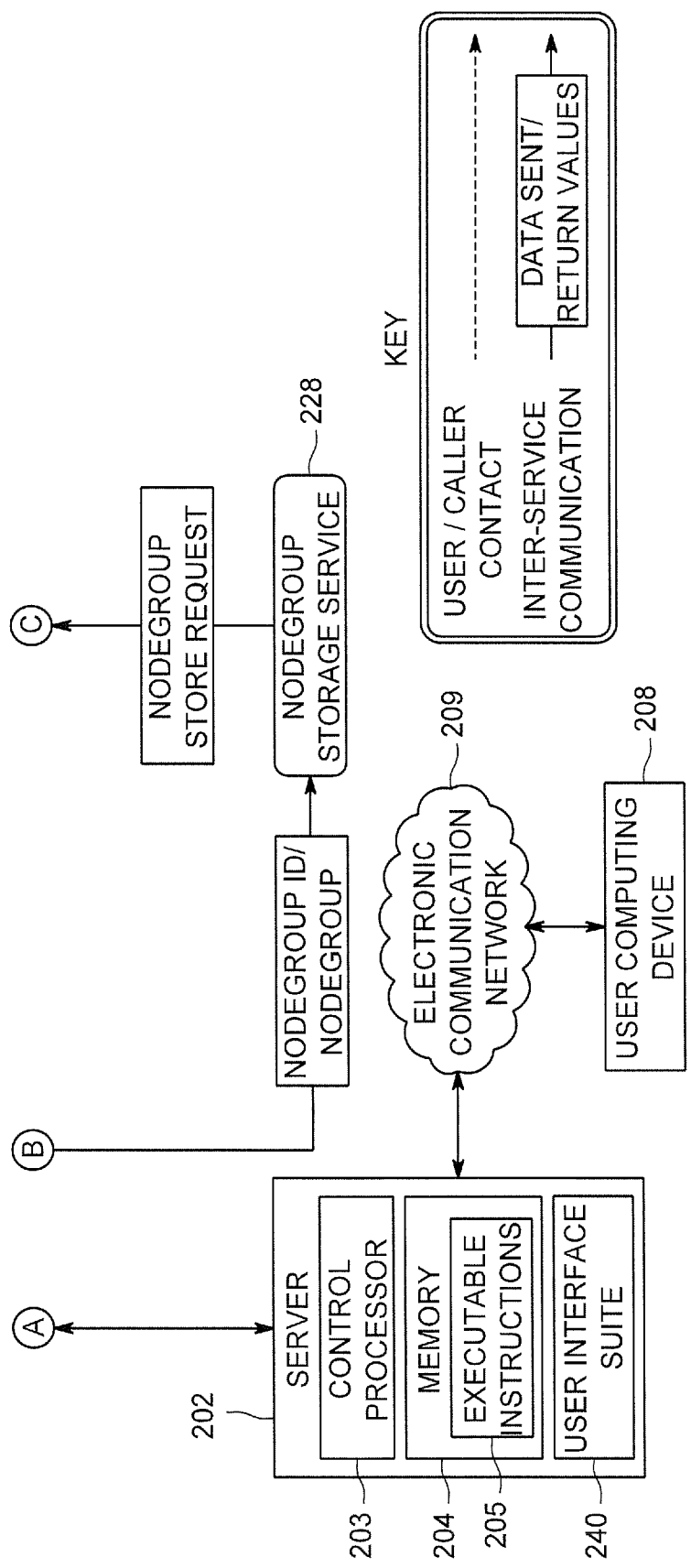

FIGS. 2A-2B depict framework system 200 for querying semantics from multiple environments in accordance with embodiments. Framework system 200 includes server 202 in communication with user computing device 208 across electronic communication network 209. The server can include server control processor 203 and memory 204. The server control processor can access executable program instructions 205, which causes control processor 202 to control components of system 100 to support embodying operations. In some implementations, executable program instructions 205 can be located in a data store accessible to control processor 203. Dedicated hardware, software modules, and/or firmware can implement embodying services disclosed herein.

The user computing device provides calls/queries to server 202, which in turn directs framework system 200 components to perform the calls/queries. Results are communicated back to the user computing device by the server across electronic communication network 209.

Electronic communication network 209 can be, can comprise, or can be part of, a private internet protocol (IP) network, the Internet, an integrated services digital network (ISDN), frame relay connections, a modem connected to a phone line, a public switched telephone network (PSTN), a public or private data network, a local area network (LAN), a metropolitan area network (MAN), a wide area network (WAN), a wireline or wireless network, a local, regional, or global communication network, an enterprise intranet, any combination of the preceding, and/or any other suitable communication means. It should be recognized that techniques and systems disclosed herein are not limited by the nature of network 209.

User computing device 208 can be of any type of computing device suitable for use by an end user in performance of the end user's purpose (e.g., personal computer, workstation, thin client, netbook, notebook, tablet computer, mobile device, etc.). The user computing device can be in bidirectional communication with server 202 across electronic communication network 209.

The framework components can provide access to semantics from multiple environments with different operational requirements which shared a common set of use cases. Embodying systems and methods work equally well in monolithic applications, Big Data applications, and network applications composed of collections of interacting microservices. These common features can be placed in a core library for use by the monolithic and Big Data use cases, allowing the applications to operate with minimal network overhead (other than reading and writing to the triple store). To facilitate microservice-based applications, thin microservice wrappers can be written to provide service access to this functionality. Additionally, clients can be provided for these services to handle the I/O requirements related to the microservice layer. This code structure provides calling processes consistent component behavior regardless of how the components are called. Additionally, this code structure simplifies porting the application between target environments.

The reference implementation of the framework can be constructed from a collection of microservices. Each microservice provides a segment of the functionality required to handle the current set of target use cases. These services communicate over HTTP. FIGS. 2A-2B includes the microservices and their interactions (i.e., data sent to, and return values from, the microservices).

Framework system 200 includes components that provide features used for the basic interactions with the semantic store. These include services to perform queries (e.g., external data connectivity (EDC) query generator 220, EDC query executor 222, SPARQL query service 224), ingest data (ingestion service 226), store nodegroups for future use (nodegroup storage service 228), and execute stored nodegroups (nodegroup component execution service 210). The features of these components can be used by applications built using the framework.

Nodegroup component execution service 210 can include one or more representations of a subgraph needed to fulfill a user query. This subgraph representation contains a set of classes and a SPARQL identifier for each. Also present is a list of properties that are returned or constrained for each class, along with an identifier used in the generated SPARQL and SPARQL code to perform any constraints. The nodegroup component also contains properties which link the class to other classes in the nodegroup.

From the information contained in a nodegroup, the framework can automatically generate several types of SPARQL queries. Most common are SELECT DISTINCT queries, which walk the entire nodegroup building SPARQL code connections and constraints, and selecting any value labelled by the user to be returned. It can also generate a form of the SELECT DISTINCT query that is very useful in building constraint clauses for a query. For any SPARQL id ?A in a query, all other elements can be removed from the SELECT clause, and all constraints are removed from ?A, resulting in a query that generates all existing values of ?A in the triple-store. These can then be formulated into a VALUES or FILTER clause for ?A. In practical terms, this generates a list of legal filter values for any item in the query based upon the existing data. In addition to SELECT queries, the nodegroup can also be used to generate INSERT queries to add data to the semantic store.

The nodegroup can also be used as an exchangeable artifact, allowing a subgraph of interest to be captured, stored for future use, or passed between services. With the help of ontology information, the nodegroup data structure can be much more effectively validated, modified, and displayed than could raw SPARQL.

The path-finding functionality works by using a selected new class as the path endpoint and all the classes in the existing nodegroup as start points. If needed, intervening classes are suggested as part of the potential paths. It is implemented with the A* algorithm, with a few modifications for performance. Chiefly, the search is limited to n hops or m seconds of processing. This effectively results in local path-finding.

Path-finding can not only assist query-building both by users as they drag-and-drop items to build a nodegroup, but also by dispatcher component 215 when it determines whether external services need to be called to retrieve data. Pathfinding techniques can be applied to identify these external services. These external services can require additional information (e.g., calling parameters) of which the user is not aware, and which are subject to flux as models are revised. Path-finding allows this information to be located and added without user intervention.

The query services function as a wrapper around triple store 230. The query service abstracts the interaction with the triple store, insulating calling processes from the particulars of a given triple store regarding connections, query preparations and related tasks. The query service can also provide utility functions related to the triple store, including:

Upload of Web Ontology Language (OWL) models to the triple store;
Removal of all triples with a given URI prefix; and
Clearing a named graph from the triple store.

Ingestion service 226 provides a model-based mechanism for inserting data into the triple store. The ingestion service uses a template based on the nodegroup which adds information about which columns from a record set to associate with given classes and properties in the semantic model. These associations allow for pre-defined prefixes, concatenation of multiple columns, and basic transformations to be applied as the data is transformed into triples.

Basing the template on the nodegroup also allows the ingestion service to check the potential ingestion attempt for consistency and validity before any data is written. Upon receipt of an ingestion template, the service validates that the required nodes and properties exist in the model currently in the triple store. In the event the current model can no longer support the creation of the nodegroup, an error is generated.

The nodegroup is also used for generating INSERT statements for the instance data. This is convenient as it allows for a second level of checks to be performed before any data is inserted into the triple store. As each datum is transformed and prepared for insertion, an import specification handler uses the datatype information in the nodegroup to determine whether there is a type mismatch between the intended data and declared types in the model.

The ingestion service can include two modes of operation. The first mode processes incoming records and inserts data that passes all checks. In the event a record should fail, that record is skipped and an error report is generated indicating why the record failed. This allows for partial loads to be performed. The second ingestion service mode checks the data for consistency before data is inserted. If all the data passes testing, then all of the data is inserted. If any record fails, no data is inserted and an error report is generated indicating which records would have failed, along with potential reasons for the failures.

Nodegroup storage service 228 provides basic features for the storage and retrieval of nodegroups. The nodegroup storage service allows nodegroups to be stored in a common location for multiple callers to access. This service can also provide utility functions, including listing stored nodegroups and returning runtime constraints for a given stored nodegroup.

The nodegroup execution service 210 allows nodegroups registered in the nodegroup storage service to be treated similarly to SQL stored procedures. The execution service allows a user to identify a desired nodegroup by name and execute it against a provided triple store connection. If the nodegroup supports runtime constraints, the caller can provide a mapping containing these constraints, which can be applied before the query is run. The execution service also allows specification of constraints used by external data requests. These latter constraints can be used by dispatcher component 215 and EDC query generator 220 when gathering the requested data.

The nodegroup execution service calls dispatcher component 215 in order to perform query operations. The execution service can also provide pass-through functionality for the results and status services, providing a single point of access for callers. To perform ingestion, the nodegroup execution service contacts the ingestion service directly.

In accordance with embodiments, framework system 200 can retrieve data from external services. A group of EDC components manage the metadata about how to access data stored externally. This metadata can include information about known services from which data can be requested, datatype-specific filtering opportunities, the type and location of external data related to a semantic model's instance data, and the required metadata to query a given external system. Dispatcher component 215 can determine whether EDC operations are required, orchestrating the query of external data, and merging the results with semantic query results.

The dispatcher component can check an incoming nodegroup and determine whether the query represents one which can be satisfied using only data from the triple store or whether the EDC functionality is required to satisfy the request. This is done by determining whether any requested data comes from classes descending from known external data types.

Dispatcher component 215 can contain dispatch service manager 216, a sub-component which is used to determine the proper services to call when EDC is required. When EDC functionality is not required, the dispatcher component acts as a pass-through to SPARQL query service 224. If EDC operations are required, the dispatcher component consults a services model to determine what metadata is required for the external invocation. Then, using path-finding, the dispatcher component can augment the incoming nodegroup to include the additional metadata.

The information from the semantic query results are then binned, providing context for EDC results. Each semantic result bin is given a unique identifier (UUID) to simplify associating the semantic results with the EDC results. The dispatcher component then calls the external query generation and execution services, to respectively generate and execute queries on external data stores 232. Although for simplicity only one external data store is depicted, it should be readily understood that multiple, disparate data stores can be queried as disclosed herein.

After the completion of the external query execution, the dispatcher component can fuse the incoming results with the results from the semantic portion of the query. This fusion ensures that the external results are returned with the proper context. This is needed because a single nodegroup sent to the EDC tiers can end in many external queries being run which lack internal information to uniquely identify important subsets.

Depending on the network environment, EDC operations can require more time to complete than is available for a single HTTP connection. Thus, the dispatcher service is designed to operate asynchronously. Upon reception of a nodegroup, the dispatcher component generates a job identifier for the task and returns it to the client. From this point, the dispatcher updates the job information by calling the status service. When ready, the fused results are written to the results service. Clients communicate with the status and results services for status information on their jobs.

EDC query generator 220 accepts a given input format and outputs a collection of one or more queries specifically tailored to a given external data source. The EDC query generator takes a table as input which contains, at minimum, a collection of UUIDs relating to the semantic results bins. The input can also include metadata, as defined in a service model of the particular EDC query service. For example, to generate queries on an external time series database, relevant metadata can include table names and column names in the time series store.

EDC query generator 220 encapsulates the information to interact with the external service. This encapsulation insulates the dispatcher and other components from knowledge of any given external store, thus enabling one of many disparate external stores to be readily switched in and out. The query generator is task-specific to both the internal structure of the external data and the requirements of the external system. The generator returns a table of queries, one per input UUID, which can be used by EDC query executor 222.

EDC query executor 222 can be configurable specific to protocols associated with an external data source and use case. The EDC query executor accepts the structure output by the matching query generator and executes the queries to retrieve the data. As with the EDC query generator, the EDC query executor insulates the dispatcher from any understanding of the external data operations. Provided that the executor can accept a table of queries authored by the paired generator and maintains the UUID association, it can interact properly with the dispatcher, which acts as a pass through between the two components. When the EDC query executor has completed, it returns a table of the results to the dispatcher component, appending the correct original UUIDs to each of the returned record.

Status service component 234 acts as an intermediary between dispatcher component 215 and the caller. At a regular interval, the dispatcher writes its current state to the status service, indicating how much progress has been made on the job. The calling service may continually poll the status service to determine the state of the job. Upon job completion, the status service is given information on the success or failure of the task. In the event of a failure, the dispatcher updates the service with information on the likely cause of the failure as determined by the internal logic of the various services involved.

Results service component 236 accepts the fused results from the dispatcher component and provisions them to file system 238 for storage. The fused results can be retrieved by the original caller. The results service uses a model in the semantic store to keep track of where the results are provisioned.

User Interface Suite 240 provides components that provide an abstraction layer for users unfamiliar with the semantic web technology stack to interact with both framework system 200 and semantically-enabled data. The abstraction layer of user interfaces provides a user skilled in the domain of interest the capability to generate queries, map and ingest data, and explore the semantic models. These components expose functionality built into the Ontology Info and nodegroup objects. The major features exposed are:
  full-text-index based search of the model;
  path-finding between a selected class and the nodes already used in the nodegroup; and
  automated generation of SPARQL queries based on the user-defined nodegroup.

The components of user interface suite 240 simplify the experience of interacting with the data in the semantic store by exposing functionality which can directly interact with instance data. Filter dialogues are supported to guide the user to directly query instance data allowing for filters based on data already present as well as regular expressions. The UI allows for previews of query response, saving connection information, and mapping a nodegroup's properties to entries in a data source for use during ingestion. The UI allows the saving and restoring of a user's session through the import and export of serialized nodegroups.

The framework provides programmatic interfaces for interacting with the semantic data and services. This interface can be, for example, a JAVA API which provides clients for the services. These JAVA clients handle the network I/O for the caller and present the usage as regular method calls. Additionally, these interfaces present features for the manipulation of nodegroups and querying of the ontology info object. In some implementations, for users who do not use JAVA, the services can be accessed via plain HTTP/HTTPS calls.

Figure 3:
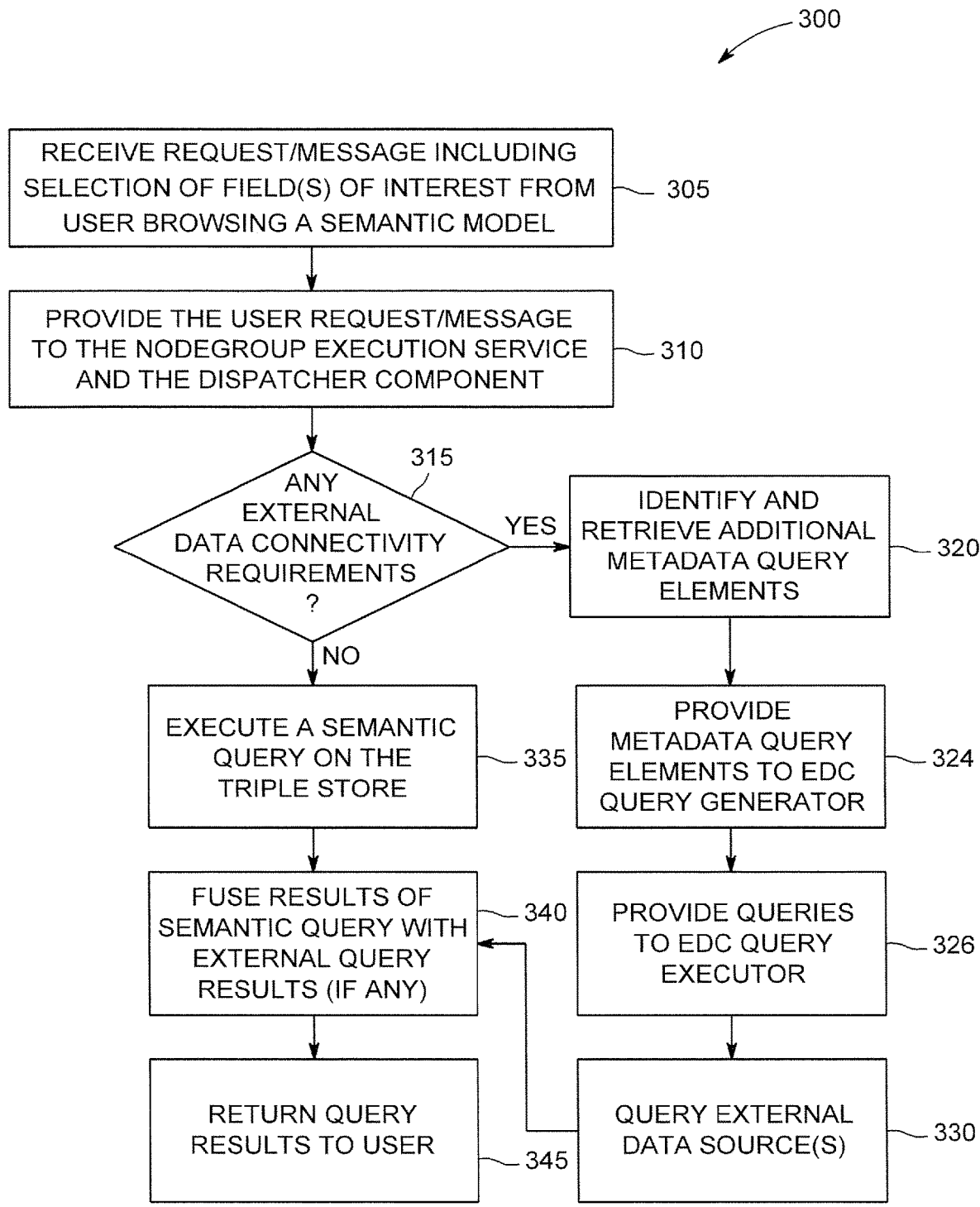
FIG. 3 depicts a flowchart of a process for augmenting a semantic query of multiple environments in accordance with embodiments.

FIG. 3 depicts process 300 for augmenting a semantic query of multiple environments in accordance with embodiments. Implementation of embodying methods allow users to search data sources containing disparate data (e.g., semantic, image, time series, documents, property graph, or other formats) without an understanding of the underlying model. A selection of field(s) of interest can be received, step 305, at server 202 in message/request from a user browsing a sematic model. In some implementations, the message/request can be in the form of a plain-English statement. The user message/request can identify one or more nodegroups (i.e., a datatype abstraction for the subgraph of interest). In some implementations the user can be remotely located from the server at user computing device 208. In other implementations, the user computing device can be local to the framework system, and the server can be in communication with one or more remotely located data stores (e.g., triple store 230, external data store 232, file system 238, etc.).

The user message/request is provided, step 310, to nodegroup execution service 210 and dispatcher component 215. The nodegroup execution service can accept the identified nodegroup and execute it against triple store 230. The nodegroup execution service can call the dispatcher component to perform query operations of disparate data sources by providing nodegroup identity information along with any user-specified runtime constraints. Dispatcher component 215 can determine, step 315, if there are any external data connectivity requirements associated with the user message/request.

If there are external data connectivity requirements, metadata query elements can be identified and retrieved, step 320. The metadata query elements can be provided, step 324, to EDC query generator 220. The EDC query generator generates the external queries and provides, step 326, the EDC queries to EDC query executor 222. The EDC query executor, queries (step 330) one or more external data sources. The results of the query are returned for later fusion with semantic query results.

If at step 315 there are no external data connectivity requirements process 300 continues to step 335, where a semantic query is executed against data stored in triple store 330. It should be readily understood that embodying systems and methods can accommodate both semantic queries and EDC queries generated from the same user message/request.

Semantic query results and external query results (if any) are fused, step 340. The fused result is returned to the user, step 345.

Embodying systems and methods can accommodate user cases that can require access to information in semantic and other data stores augmented by context surrounding this data. In accordance with embodiments, users can define queries to search the data without an understanding of the underlying model. Allowing path-finding and query generation subsystems to handle the data retrievals allow subject matter experts to search using domain terms.

For example, large scale testing of turbines and turbine components can produce large quantities of test measurement data (1 Hz data collected for 10,000+ parameters over periods extending from hours to months per test), as well as extensive test configuration data (e.g., hundreds of parameters per test). With these test parameters, a single test can generate gigabytes to terabytes of raw data, depending on the number of parameters and duration.

Typically, test configuration data can be stored separately from the test measurement data, with no codification of how they relate to each other, and no capability for integrated query either by expert-driven search or by programmatic access. Further, the test measurement data can be collected from many different sensors and calculations, with significant variation of data record allocation across tests—e.g., in one test a particular column could contain temperature measurements in one test and pressure measurements in another test. This variable mapping could make this information difficult to track down and dependent on institutional memory.

Due to the factors above, performing a query based on a user's plain-English message/request such as "retrieve emissions measurements and combustor temperature for tests run on Test Stand 5 in the last 6 months" could require first querying the test configuration store for the relevant test numbers, manually accessing a document to identify the column names of interest, and querying the test measurement storage to retrieve those parameters for each test, and then collating the results. This data collection process could often take days or weeks to complete, depending on the complexity of the query, and involve a high amount of human interaction. Making this data available via a semantic framework as disclosed herein can significantly reduce the time, effort, and a priori knowledge necessary to fulfill these requests.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor to perform a method of augmenting a semantic query of multiple external data sources, as disclosed above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

We claim:
1. A method of augmenting a semantic query of multiple external data stores, the method comprising:
receiving a message from a user computing device, the message including a request to search two or more disparate external data stores for one or more fields of interest designated by a user;
applying a path-finding technique to identify connections between the one or more fields of interest in a semantic model;

automatically generating a query based on the connections;

receiving from the user an indication to execute the query;

intercepting the executing query by a dispatcher component, the dispatcher component determining if instance data for any of the one or more fields of interest is contained in more than one disparate external data store, instance data contained in a first external data store being of a different data type than data stored in a second external data store;

based on a determination that instance data is contained in more than one disparate external data store, identifying an external data service to retrieve any external data responsive to the query;

the dispatcher component executing a semantic query on a triple store;

fusing results from the semantic query with the retrieved any external data;

constructing a polyglot persistent knowledge graph from the fused results; and providing the polyglot persistent knowledge graph to the user computing device.

2. The method of claim 1, the message including plain-English identification of one or more nodegroups of a subgraph.

3. The method of claim 1, including the one or more fields of interest obtained from the semantic model.

4. The method of claim 1, including:

applying user selected filters to the one or more fields of interest as the query is generated; and automatically generating one or more subqueries to populate the filters.

5. The method of claim 1, the determining if instance data is contained in an external data store including providing at least one of providing nodegroup identity information and external data connectivity requirements to the external data service.

6. The method of claim 5, including, if there are external data connectivity requirements, providing metadata query elements to the external data service.

7. A non-transitory computer readable medium containing computer-readable instructions stored therein for causing a control processor to perform a method of augmenting a semantic query of multiple external data stores, the method comprising:

receiving a message from a user computing device, the message including a request to search two or more disparate external data stores for one or more fields of interest designated by a user;

applying a path-finding technique to identify connections between the one or more fields of interest in a semantic model;

automatically generating a query based on the connections;

receiving from the user an indication to execute the query;

intercepting the executing query by a dispatcher component, the dispatcher component determining if instance data for any of the one or more fields of interest is contained in more than one disparate external data store, instance data contained in a first external data store being of a different data type than data stored in a second external data store;

based on a determination that instance data is contained in more than one disparate external data store, identifying an external data service to retrieve any external data responsive to the query;

the dispatcher component executing a semantic query on a triple store;

fusing results from the semantic query with the retrieved any external data;

constructing a polyglot persistent knowledge graph from the fused results; and providing the polyglot persistent knowledge graph to the user computing device.

8. The non-transitory computer readable medium of claim 7 containing computer-readable instructions stored therein to cause the control processor to perform the method, including the message including plain-English identification of one or more nodegroups of a subgraph.

9. The non-transitory computer readable medium of claim 7 containing computer-readable instructions stored therein to cause the control processor to perform the method, including the one or more fields of interest obtained from the semantic model.

10. The non-transitory computer readable medium of claim 7 containing computer-readable instructions stored therein to cause the control processor to perform the method, including:

applying user selected filters to the one or more fields of interest as the query is generated; and automatically generating one or more subqueries to populate the filters.

11. The non-transitory computer readable medium of claim 7 containing computer-readable instructions stored therein to cause the control processor to perform the method, the determining if instance data is contained in an external data store including providing at least one of providing nodegroup identity information and external data connectivity requirements to the external data service.

12. The non-transitory computer readable medium of claim 11 containing computer-readable instructions stored therein to cause the control processor to perform the method, including, if there are external data connectivity requirements, providing metadata query elements to the external data service.

13. A system for augmenting a semantic query of multiple external data stores, the system comprising:

a control processor in communication with a user computing device, the control processor configured to receive a message from the user computing device, the message including a request to search a data store for one or more fields of interest designated by a user;

a nodegroup component execution service configured to identify representations of a subgraph based on the one or more fields of interest;

a dispatcher component called by the nodegroup component execution service, the dispatcher component configured to execute one or more queries based on the subgraph representations;

an ontology information component configured to generate a tree containing at least one of classes, subclasses, and properties, the tree used to build the one or more queries;

the control processor configured to execute executable instructions that cause the control processor to perform a method of:

receiving a message from a user computing device, the message including a request to search two or more disparate external data stores for one or more fields of interest designated by a user;

applying a path-finding technique to identify connections between the one or more fields of interest in a semantic model;

automatically generating a query based on the connections;
receiving from the user an indication to execute the query;
intercepting the executing query by the dispatcher component, the dispatcher component determining if instance data for any of the one or more fields of interest is contained in more than one disparate external data store, instance data contained in a first external data store being of a different data type than data stored in a second external data store;
based on a determination that instance data is contained in more than one disparate external data store, identifying an external data service to retrieve any external data responsive to the query;
the dispatcher component executing a semantic query on a triple store;
fusing results from the semantic query with the retrieved any external data;
constructing a polyglot persistent knowledge graph from the fused results; and
providing the polyglot persistent knowledge graph to the user computing device.

14. The system of claim 13, the message including plain-English identification of one or more nodegroups of the subgraph.

15. The system of claim 13, the executable instructions including instructions to cause the control processor to perform the method by including the one or more fields of interest obtained from the semantic model.

16. The system of claim 13, the executable instructions including instructions to cause the control processor to perform the method by including:
applying user selected filters to the one or more fields of interest as the query is generated; and
automatically generating one or more subqueries to populate the filters.

17. The system of claim 13, the executable instructions including instructions to cause the control processor to perform the determining if instance data is contained in an external data store by including providing at least one of providing nodegroup identity information and external data connectivity requirements to the external data service.

18. The system of claim 17, the executable instructions including instructions to cause the control processor to perform the method by including, if there are external data connectivity requirements, providing metadata query elements to the external data service.

* * * * *